(12) United States Patent
Dangui et al.

(10) Patent No.: US 9,100,177 B2
(45) Date of Patent: Aug. 4, 2015

(54) SYSTEMS AND METHODS FOR ACKNOWLEDGING COMMUNICATIONS FROM A PLURALITY OF DEVICES

(75) Inventors: Rahul Dangui, San Diego, CA (US); Simone Merlin, San Diego, CA (US); Santosh Paul Abraham, San Diego, CA (US); Vincent Knowles Jones, IV, Redwood City, CA (US); Zhi Quan, San Diego, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/601,002

(22) Filed: Aug. 31, 2012

(65) Prior Publication Data

US 2013/0235781 A1 Sep. 12, 2013

Related U.S. Application Data

(60) Provisional application No. 61/530,724, filed on Sep. 2, 2011.

(51) Int. Cl.
*H04W 72/00* (2009.01)
*H04L 1/16* (2006.01)
*H04L 1/18* (2006.01)

(52) U.S. Cl.
CPC ............ *H04L 1/1614* (2013.01); *H04L 1/1685* (2013.01); *H04L 1/1864* (2013.01); *H04L 1/1896* (2013.01)

(58) Field of Classification Search
CPC ... H04L 1/0079; H04L 1/1628; H04L 1/1614; H04L 1/1685; H04L 1/1896; H04L 1/1864; H04L 1/1664; H04L 12/1868; H04L 12/189; H04L 1/1854; H04L 2001/0093; H04L 1/1861; H04L 1/1671; H04L 1/1887; H04L 1/1607; H04L 1/1621; H04L 1/1848; H04L 5/0055; H04L 1/1835; H04L 12/1863; H04L 12/5695; H04L 47/10; H04L 47/2441; H04L 49/201; H04L 61/2069; H04L 65/4076; H04L 2001/125; H04L 1/0006; H04L 1/08; H04L 1/1812; H04L 5/0094; H04L 12/6418; H04L 1/1803; H04L 1/1877; H04L 1/188; H04L 1/1883; H04L 5/0007; H04L 63/08; H04L 12/1886; H04L 1/0002; H04L 1/001; H04L 1/1635; H04L 1/1642; H04L 1/18; H04L 1/1809; H04L 1/1829; H04L 1/1867; H04L 1/189; H04L 2001/0094; H04L 5/0016; H04L 5/0044; H04L 5/0048; H04L 5/0053; H04W 28/04; H04W 72/005; H04W 4/06; H04W 84/12; H04W 52/0209; H04W 72/0406; H04W 74/004; H04W 72/1289; H04W 74/02; H04W 74/0833; H04W 74/04; H04W 74/0816; H04W 68/00; H04W 72/1231; H04W 84/18; H04W 24/10; H04W 52/08; H04W 52/20; H04W 52/50; H04W 72/0413; H04W 72/042; H04W 72/0446; H04W 72/1205; H04W 72/121; H04W 74/08; H04W 74/0866; H04W 76/023; H04W 28/06; H04W 28/065; H04W 40/02; H04W 74/06; H04W 88/08
USPC ......... 370/312, 252, 338, 389, 278, 282, 328, 370/329, 473, 474, 477, 229, 230, 235, 253, 370/280, 310, 311, 315, 321, 330, 332, 335, 370/336, 337, 341, 342, 345, 346, 347, 348, 370/349, 394, 401, 412, 418, 420, 441, 445, 370/449, 461, 468, 491; 455/422.1
See application file for complete search history.

(56) References Cited

U.S. PATENT DOCUMENTS

| | | | |
|---|---|---|---|
| 5,282,204 A | 1/1994 | Shpancer et al. | |
| 6,680,920 B1 | 1/2004 | Wan | |
| 6,775,707 B1 | 8/2004 | Bennett et al. | |
| 7,631,240 B2 | 12/2009 | Frederiks et al. | |
| 2006/0018332 A1 | 1/2006 | Kakani et al. | |
| 2007/0186134 A1* | 8/2007 | Singh et al. | 714/749 |
| 2007/0258466 A1 | 11/2007 | Kakani | |
| 2008/0095127 A1* | 4/2008 | Taki | 370/338 |

| 2009/0232053 A1* | 9/2009 | Taki et al. ............. 370/328 |
| 2009/0238160 A1 | 9/2009 | Bhatti et al. |
| 2009/0327443 A1* | 12/2009 | Pawar et al. ............. 709/207 |
| 2011/0090855 A1* | 4/2011 | Kim ............. 370/329 |
| 2011/0116435 A1* | 5/2011 | Liu et al. ............. 370/312 |
| 2012/0170557 A1* | 7/2012 | Tsfati et al. ............. 370/338 |
| 2012/0224537 A1 | 9/2012 | Bahr et al. |
| 2013/0100952 A1* | 4/2013 | Hart et al. ............. 370/390 |
| 2013/0294360 A1* | 11/2013 | Yang et al. ............. 370/329 |
| 2014/0079016 A1* | 3/2014 | Dai et al. ............. 370/330 |

FOREIGN PATENT DOCUMENTS

| DE | 19947344 A1 | 4/2001 |
| DE | 102005025519 A1 | 12/2006 |
| EP | 0529269 A2 | 3/1993 |
| EP | 2028781 A1 | 2/2009 |
| EP | 2134023 A1 | 12/2009 |
| EP | 2184950 A1 | 5/2010 |
| JP | 2008509622 A | 3/2008 |
| WO | WO-2010076868 A1 | 7/2010 |
| WO | 2012030541 | 3/2012 |

OTHER PUBLICATIONS

Kim, Byung-Seo et al., "Reliable wireless multicasting with minimum overheads in OFDM-based WLANs", Proceedings from ICC '08: IEEE International Conference on Communications, 2008, 2519-2523. doi: 10.1109/ICC.2008.477.

International Search Report and Written Opinion—PCT/US2012/053614—ISA/EPO—Mar. 19, 2013.

* cited by examiner

*Primary Examiner* — Charles C Jiang
*Assistant Examiner* — Rose Clark
(74) *Attorney, Agent, or Firm* — Kevin T. Cheatham

(57) ABSTRACT

Systems, methods, and devices for acknowledging communications from a plurality of wireless devices in a wireless network are described herein. In some embodiments, an access point for the wireless network transmits a group acknowledgment (ACK) to indicate whether communications (packets) from the plurality of wireless devices have been received or correctly decoded within some time interval. Each wireless device may have a different time interval associated with it. For some embodiments, the time interval for a wireless device is relative to when a previous group ACK was sent. A group ACK may include a bitmap. In some embodiments, the bitmap indicating whether a communication has been received or correctly decoded may be transmitted as part of a beacon.

42 Claims, 13 Drawing Sheets

| Field Name | Size in Octets | Field Description |
|---|---|---|
| fc | 2 | frame control |
| dur | 2 | duration |
| a1 | 6 | address 1 |
| fcs | 4 | frame control sequence |
| TOTAL SIZE | 14 | |

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE | 16 | |

*FIG. 3*

SYSTEMS AND METHODS FOR ACKNOWLEDGING COMMUNICATIONS FROM A PLURALITY OF DEVICES

CLAIM OF PRIORITY UNDER 35 U.S.C. §119

The present Application for Patent claims priority to Provisional Application No. 61/530,724 entitled "SYSTEMS AND METHODS FOR ACKNOWLEDGING COMMUNICATIONS FROM A PLURALITY OF DEVICES" filed Sep. 2, 2011, and assigned to the assignee hereof and hereby expressly incorporated by reference herein.

FIELD OF DISCLOSURE

The present invention is related to wireless communication networks.

BACKGROUND

In many telecommunication systems, communications networks are used to exchange messages among several interacting, spatially separated devices. Networks may be classified according to geographic scope, which could be, for example, a metropolitan area, a local area, or a personal area. Such networks may be designated as a wide area network (WAN), metropolitan area network (MAN), local area network (LAN), wireless local area network (WLAN), or personal area network (PAN). Networks also differ according to the switching and routing techniques used to interconnect the various network nodes and devices (e.g. circuit switching vs. packet switching), the type of physical media employed for transmission (e.g. wired vs. wireless), and the set of communication protocols used, e.g. Internet protocol suite, SONET (Synchronous Optical Networking), or Ethernet.

Wireless networks are often preferred when the network elements are mobile and thus have dynamic connectivity needs, or if the network architecture is formed in an ad hoc, rather than fixed, topology. Conventional wireless networks may use electromagnetic waves in the radio, microwave, infrared, or optical frequency bands, for example. Wireless networks advantageously facilitate user mobility and rapid field deployment when compared to fixed wired networks.

The devices in a wireless network may transmit and receive information between each other. As part of this communication process, a first device that receives information from a second device may transmit an acknowledgment (ACK) to the second device acknowledging that the first device received the information. The act of transmitting an acknowledgment adds additional overhead to communications in the wireless network.

This additional overhead may be especially problematic in some wireless networks. For example, in some areas, such as in Europe, some spectrums (e.g., wireless channels, frequency bands, etc.) have a transmit duty cycle restriction of 100 seconds per hour. In these areas, a given transmitter is only allowed to transmit in those spectrums for 100 seconds or less in a given hour. In some cases, such as for devices collecting measurements from sensors, the overhead of sending ACKs may alone exceed this duty cycle restriction. Thus, improved systems, methods, and devices for communicating ACKs are desired.

SUMMARY

Embodiments of the invention are directed to systems and method for communicating in a wireless network. More specifically, some embodiments are directed to a method of communicating in a wireless network having an access point and a plurality of wireless devices associated with the access point. For each wireless device in the plurality of wireless devices, the method comprises determining at the access point whether one or more packets have been correctly decoded within a time interval associated with the each wireless device; generating at the access point a plurality of indicators in one to one correspondence with the plurality of wireless devices, where each indicator signifies a result of the determining for a corresponding wireless device; and broadcasting by the access point a group acknowledgment comprising the plurality of indicators.

Some embodiments are directed to an apparatus for communicating in a wireless network having a plurality of wireless devices. The apparatus comprises a processor configured to determine for each wireless device whether at least one packet has been correctly decoded within a time interval associated with the each wireless device; and further configured to generate a plurality of indicators in one to one correspondence with the plurality of wireless devices, each indicator signifying whether the at least one packet from a corresponding wireless device is correctly decoded. The embodiment also includes a transmitter coupled to the processor to broadcast a group acknowledgment comprising the plurality of indicators.

Some embodiments are directed to an apparatus for communicating in a wireless network having a plurality of wireless devices, where the apparatus comprises means for determining for each wireless device in the plurality of wireless devices whether at least one packet has been correctly decoded within a time interval associated with the each wireless device; means for generating a plurality of indicators in one to one correspondence with the plurality of wireless devices, each indicator signifying a result of the means for determining for a corresponding wireless device; and means for broadcasting a group acknowledgment comprising the plurality of indicators.

Some embodiments are directed to a computer readable storage medium having instructions stored thereon that when executed by an apparatus cause the apparatus to perform a method of communicating in a wireless network having an access point and a plurality of wireless devices associated with the access point, the method comprising, for each wireless device in the plurality of wireless devices, determining at the access point whether at least one packet has been correctly decoded within a time interval associated with the each wireless device; generating at the access point a plurality of indicators in one to one correspondence with the plurality of wireless devices, each indicator signifying a result of the determining for a corresponding wireless device; and broadcasting by the access point a group acknowledgment comprising the plurality of indicators.

Some embodiments are directed to a method of communicating in a wireless network having an access point and a plurality of wireless devices, the method comprising transmitting at a first wireless device in the plurality of wireless devices a first communication to the access point; receiving at the first wireless device a group acknowledgement from the access point, the group acknowledgment comprising a plurality of indicators in one to one correspondence with the plurality of wireless devices, each indicator in the plurality of indicators signifying whether the access point correctly decoded communications from a corresponding wireless device within a time interval associated with the corresponding wireless device; and determining at the first wireless device whether the first communication was correctly decoded by the access point based on the indicator corresponding to the first wireless device.

Some embodiments are directed to a first wireless device for communicating in a wireless network having a plurality of wireless devices associated with an access point, the first wireless device belonging to the plurality of wireless devices, the first wireless device comprising a transmitter configured to transmit a first communication to the access point; a receiver configured to receive a group acknowledgement from the access point, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and a processor configured to determine whether the first communication was correctly decoded by the access point based on the indicator corresponding to the first wireless device.

Some embodiments are directed to a first wireless device for communicating in a wireless network having a plurality of wireless devices associated with an access point, the first wireless device belonging to the plurality of wireless devices, the first wireless device comprising means for transmitting a first communication to the access point; means for receiving a group acknowledgement from the access point, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and means for determining whether the first communication was correctly decoded by the access point based on the indicator corresponding to the first wireless device.

Some embodiments are directed to a computer readable storage medium having instructions stored thereon that when executed by a first wireless device cause the first wireless device to perform a method of communicating in a wireless network having an access point and a plurality of wireless devices associated with the access point, the first wireless device belonging to the plurality of wireless devices, the method comprising transmitting a first communication to the access point; receiving a group acknowledgement from the access point, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and determining whether the first communication was correctly decoded by the access point based on the indicator corresponding to the first wireless device.

BRIEF DESCRIPTION OF THE DRAWINGS

The accompanying drawings are presented to aid in the description of embodiments of the invention and are provided solely for illustration of the embodiments and not limitation thereof.

FIG. 3 illustrates an example of an acknowledgment (ACK) of a type used in certain systems for communication.

DETAILED DESCRIPTION

Figure 1:
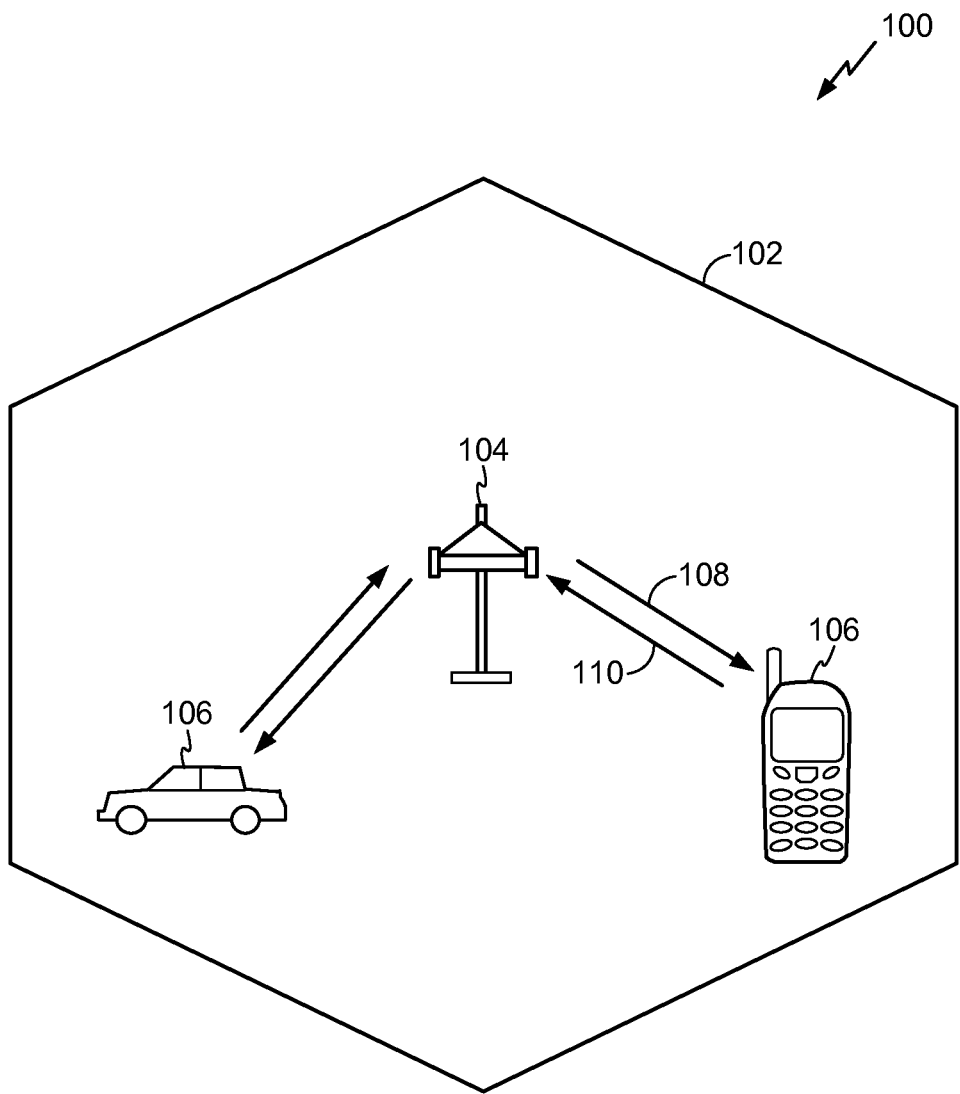
FIG. 1 illustrates an example of a wireless communication system in which aspects of the present disclosure may be employed.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Popular wireless network technologies may include various types of wireless local area networks (WLANs). A WLAN may be used to interconnect nearby devices together, employing widely used networking protocols. The various aspects described herein may apply to any communication standard, such as a standard belonging to the family of the IEEE 802.11 standard, commonly referred to as WiFi. For example, the various aspects described herein may be used as part of a WiFi advanced protocol, such as the IEEE 802.11 WiFi Advanced-N protocol, or the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and may be used to transmit wireless signals across a relatively long range, for example about one kilometer or longer.

In some implementations, a WLAN includes various devices that access the wireless network. For example, there may be two types of devices: an access point (AP) and a client. A client may be referred to as an access terminal, or as a station, the latter term often denoted by STA. In general, an AP serves as a hub or base station for the WLAN and an STA serves as a user of the WLAN. For example, an STA may be a laptop computer, a personal digital assistant (PDA), or a mobile phone. In an example, an STA connects to an AP via a WiFi (e.g., IEEE 802.11 protocol such as 802.11ah or WiFi Advanced-N) compliant wireless link to obtain general connectivity to the Internet or to other wide area networks. In some implementations an STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, or Radio Transceiver, to name a few examples.

A station may also comprise, be implemented as, or known as an access terminal, a subscriber station, a subscriber unit, a mobile station, a remote station, a remote terminal, a user terminal, a user agent, a user device, user equipment, to name a few examples. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

As discussed above, certain of the devices described herein may implement the 802.11ah standard or a WiFi Advanced-N standard, for example. Such devices, whether used as an STA, AP, or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard or a WiFi Advanced-N standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
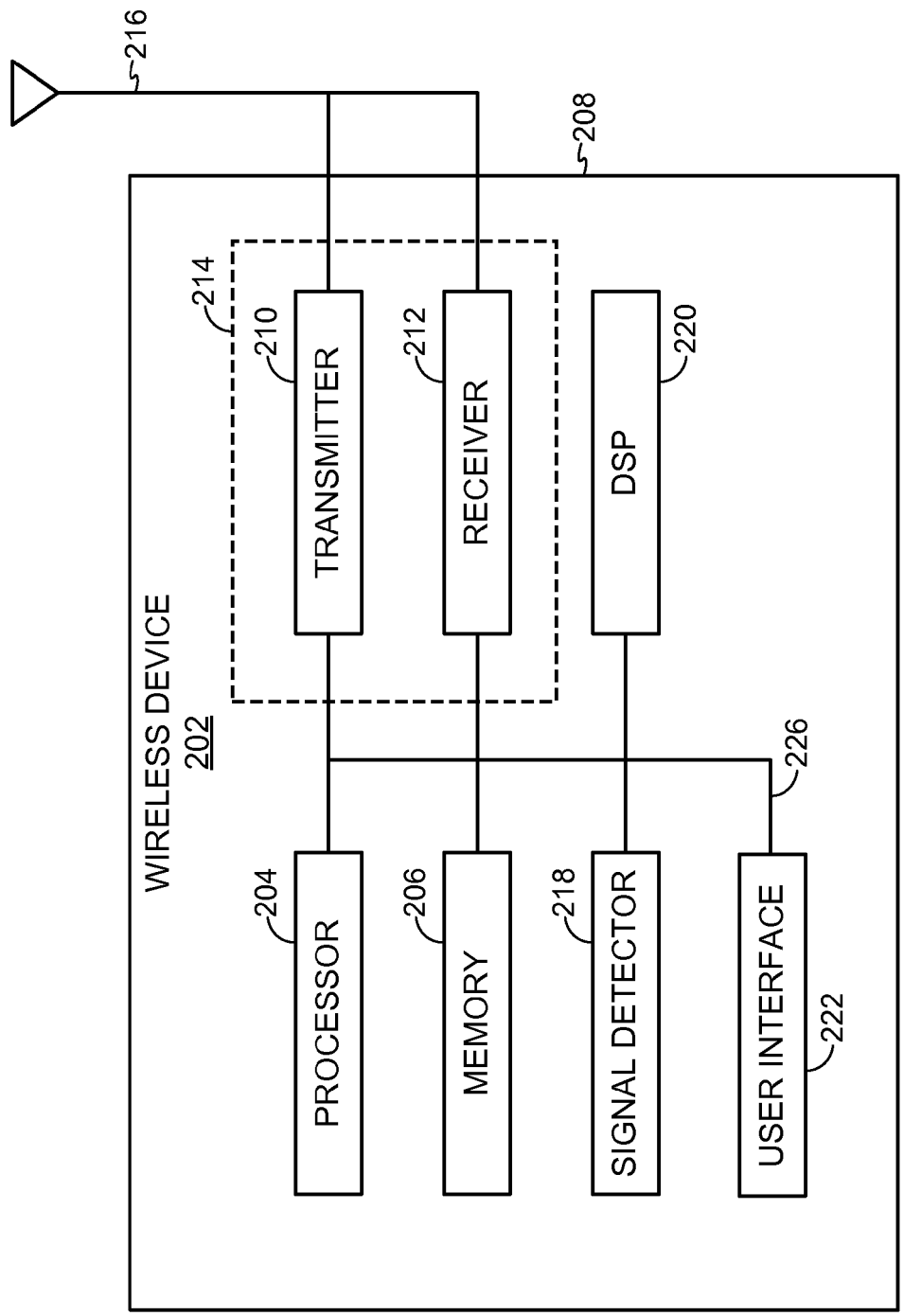
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 that controls operation of the wireless device 202. The processor 204 may also be referred to as a central processing unit (CPU). Memory 206, which may include both read-only memory (ROM) and random access memory (RAM), and which may in general be referred to as a computer readable storage medium, provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable by the processor 204 to implement the methods described herein.

In an embodiment, the processor 204 is configured to determine whether the wireless device 202 has correctly decoded a communication (e.g., a packet) from each wireless device in a plurality of wireless devices, for example by using a receiver 212 to receive and demodulate the received communication. In some embodiments, the processor 204 is further configured to generate a plurality of indicators. The plurality of indicators may be put into a one-to-one correspondence with the plurality of wireless devices, where each indicator indicates whether the processor 204 has correctly decoded a packet from the corresponding wireless device within some corresponding time interval. For some embodiments, the corresponding time interval for a wireless device may be relative to when a previous individual ACK was transmitted to that particular wireless device, whereas for some embodiments the corresponding time interval may be relative to when a group ACK was transmitted.

The above may be restated as follows. Let the integer N denote the number of wireless devices in the plurality of wireless devices. A particular wireless device may be written as device(i), where i is an index ranging from 1 to N. There are also N indicators in the plurality of indicators, where an indicator corresponding to the wireless device device(i) may be written as indicator(i). A time interval corresponding to device(i) and indicator(i) may be written as interval(i). Then, in an embodiment, the processor 204 may be configured (by software stored in memory 206) to generate, for each i=1, 2, ..., N, an indicator(i) with a value that indicates whether a packet from device(i) has been correctly decoded during a time interval interval(i). For some embodiments, interval(i) may be the same value for all i. For some embodiments, interval(i) may be relative to when a previous ACK was sent to device(i), whereas for some embodiments, interval(i) may be relative to when a previous group ACK was sent to the plurality of wireless devices.

The processor 204 may include the plurality of indicators in a bitmap or in an information element. The plurality of indicators may be included in a group acknowledgment packet ACK, described in additional detail below, where the group ACK is broadcast to the plurality of wireless devices, for example by using a transmitter 210.

In some aspects, the processor 204 is configured to process at least a portion of a group ACK received at the wireless device 202 using the receiver 212. If the wireless device 202 is waiting for an ACK for a previously transmitted communication, the processor 204 may determine whether the communication was properly received by a device transmitting the group ACK based on at least one of a plurality of indicators in the group ACK. Each of the plurality of indicators may signify whether the device transmitting the group ACK received a communication from a respective wireless device of a plurality of wireless devices. If the wireless device 202 is not waiting for an ACK for a previously transmitted communication, the wireless device 204 may halt reception of the group ACK or otherwise ignore the group ACK.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that includes the transmitter 210 and/or the receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

As alluded to above, the transmitter 210 may be configured to wirelessly transmit data packets and/or ACKs, for example group ACKs. Further, the receiver 212 may be configured to wirelessly receive data packets and/or ACKs, for example group ACKs.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

The wireless devices 202 may have a plurality of operational modes. For example, the wireless devices 202 may have a first operational mode referred to as an active mode. In the active mode, the wireless devices 202 may always be in an awake state and actively transmit/receive data with one or more other wireless devices 202. Further, the wireless devices 202 may have a second operational mode referred to as a power save mode. In the power save mode, the wireless devices 202 may be in a doze or sleep state where the wireless devices 202 do not actively transmit or receive data. For example, the receiver 212 and (possibly) DSP 220 and signal detector 218 of the wireless devices 202 may operate using reduced power consumption in the doze state. Further, in some embodiments, in the power save mode, the wireless devices 202 may occasionally enter the awake state to listen to messages from other wireless devices 202 that indicate to the wireless devices 202 whether or not the wireless devices 202 need to wake up (e.g., enter the awake state) at a certain time so as to be able to transmit or receive data. In some embodiments, in the power save mode, the wireless devices 202 are sufficiently awake that a message from another wireless device 202 can cause the wireless devices 202 to wake up (e.g., enter the awake state) or cause the wireless device 202 to wake up at a certain time so as to be able to transmit or receive data. In some embodiments, in the power save mode, the wireless devices 202 are sufficiently awake that they wake up at a certain time so as to be able to transmit or receive data.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications including ACKs and other packets. For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

FIG. 3 illustrates an example of an ACK 300 of a type that may be used in certain systems for communication. For example, the ACK 300 includes four fields: a frame control (fc) field 305, a duration/identification (dur) field 310, a receiver address (a1) field 315, and a frame control sequence (fcs) field 320. In such systems, the ACK 300 may be transmitted by a wireless device 202r to a wireless device 202t after the wireless device 202r receives a data packet transmitted from the wireless device 202t. The ACK 300 indicates to the wireless device 202t that it received the data packet. The wireless device 202t can therefore verify transmission of the data packet to the wireless device 202r. The wireless device 202t can determine that the ACK 300 is from the wireless device 202r based on the a1 field 315, which indicates the address of the wireless device 202r.

In some situations, transmitting separate ACKs to each device from which a communication has been received may be prohibitive because such transmission creates too much overhead. For example, in some areas, such as in Europe, some spectrums (e.g., wireless channels, frequency bands, etc.) have a transmit duty cycle restriction of 100 seconds per hour. In these areas, a given transmitter is only allowed to transmit in those spectrums for 100 seconds or less in a given hour. In some cases, such as for devices collecting measurements from sensors, the overhead of sending ACKs may alone exceed this duty cycle restriction. Therefore, transmission of the entire ACK 300 from the wireless device 202r to each wireless device 202t may not be feasible. For example, when the AP 104 is receiving communications from a plurality of the STAs 106, it may not be feasible for the AP 104 to send separate ACKs to each of the STAs 106.

Accordingly, systems, methods, and devices for using a single ACK that alerts a plurality of wireless devices 202t whether their communications were received are described herein. Such a group ACK may reduce overhead when compared to sending individual ACKs in the communication system 100 because separate PHY headers and padding are not needed. Accordingly, data for acknowledging communications from a plurality of wireless devices may be included with a single PHY header. Thus, less data may be transmitted overall in the communication system 100. Less transmission of data may increase the speed with which data is transmitted, may reduce the use of bandwidth by a transmitter, and may reduce the power utilized for transmission as fewer resources are used to transmit the reduced amount of data.

Figure 4:
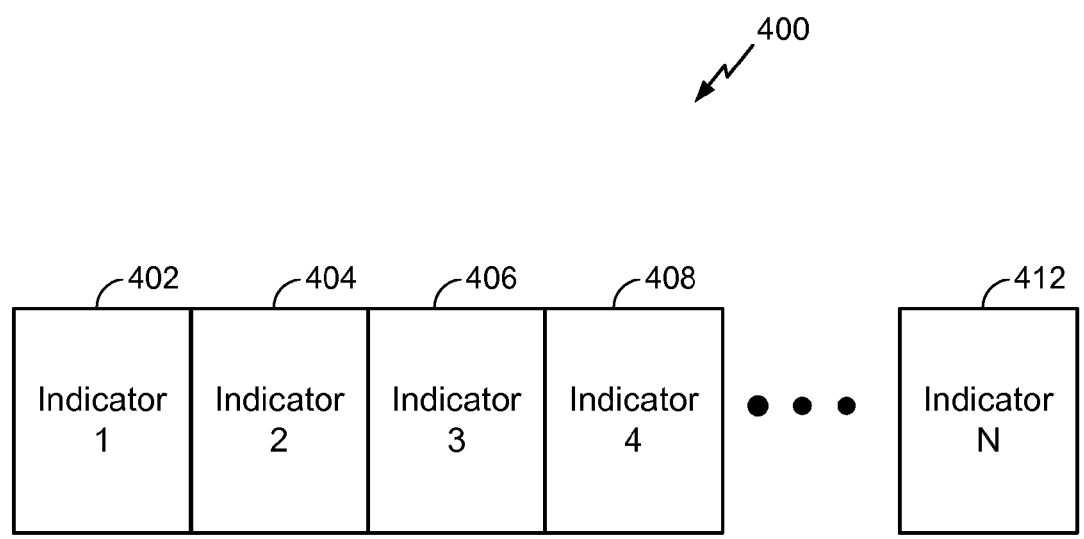
FIG. 4 illustrates an example of a plurality of indicators that may be used in a group ACK within the wireless communication system of FIG. 1.

FIG. 4 illustrates an example of a plurality of indicators 400 that may be used in a group ACK for the wireless communication system 100. Each indicator in the plurality of indicators 402-412 indicates whether a communication (e.g., packet) from a corresponding wireless device has been correctly decoded.

In some embodiments, the plurality of indicators 400 may be included in an information element (IE) within a packet. In some aspects, the IE includes one or more additional fields, which, for example, indicate a length, such as the bit length of the IE or a portion of the IE. Additionally, or alternatively, the IE may include an indication of an association identification of one or more of the STAs 106. In some embodiments, the plurality of indicators 400 does not provide indicators for all of the STAs 106. In such cases, the association identification may communicate for which of the STAs 106 the plurality of indicators 400 has corresponding indicators.

For example, in some implementations, the association identification is a list or a range of association identifications of the STAs 106 associated with the plurality of indicators 400. In some implementations, the association identification is a reference association identification, and the particular STAs 106 that have indicators in the plurality of indicators 400 is indicated based on a sequential proximity to the reference association identification or based on a mathematical operation using the reference association identification as an operand.

In some embodiments, the plurality of indicators 400 is transmitted according to a schedule. For example, the plurality of indicators 400 may be periodically broadcasted by the AP 104 to the STAs 106 once every 100 milliseconds. In some embodiments, the plurality of indicators 400 is included in a beacon that is periodically transmitted by the AP 104 to the STAs 106. In other aspects, the plurality of indicators 400 is included in a group ACK that is separate (distinct) from the beacon. In these aspects, the group ACK may be transmitted a given time period or a given number of communications after the beacon. Thus, the periodicity with which the plurality of indicators 400 is transmitted and/or received may be determined by the regularity of the beacon. In other aspects, the schedule for transmitting the group ACK is defined independently of the beacon.

The schedule of transmitting the plurality of indicators 400 may be stored in the memory 206, for example at the time of manufacturing the wireless device 202. In some aspects, the schedule is communicated to one or more of the STAs 106 by the AP 104, for example during the process of associating the STA 106 with the AP 104.

In some embodiments, one or more indicators in the plurality of indicators 402-412 include information identifying a previous communication received from a corresponding wireless device. For example, a sequence number of the previous communication may be included in the indicator. In this way, a wireless device receiving the indicator may identify which communication in a plurality of previous communications is being acknowledged in the plurality of indicators 400. If a sequence number is not included in the indicator, the wireless device may determine that a previously transmitted communication was not received or correctly decoded.

In other embodiments, a wireless device receiving the plurality of indicators 400 may be able to determine which communication in the plurality of previous communications is being acknowledged based on a time at which the plurality of indicators 400 is received by the wireless device. For example, each indicator in the plurality of indicators 402-412 may indicate to a corresponding wireless device whether the wireless device transmitting the plurality of indicators 400 has received or correctly decoded a communication or other information from the wireless device since a previous ACK was transmitted to the wireless device.

In some embodiments, received communications are only acknowledged in the form of group ACKs, which may be included in the beacon or separately transmitted. In these embodiments, each of the indicators 402-412 signify whether a communication or other information has been received or correctly decoded from a corresponding wireless device since a previous group ACK.

In some embodiments, reception or correct decoding of certain communications may be acknowledged by an individual ACK, for example an ACK that is addressed solely to the wireless device that transmitted the communication. For example, low-latency and/or high priority communications may be acknowledged by the AP 104 when the AP 104 receives such communication, as opposed to waiting until the next group ACK for acknowledgement. Thus, one or more individual ACKs may be transmitted between group ACKs in some embodiments. In these embodiments, the time period to which each of the indicators 402-412 pertains may differ. For example, the indicator 402 may indicate to a first wireless device whether a communication has been received from the first wireless device since a previous group ACK, while the indicator 404 may indicate to a second wireless device whether a communication has been received from the second wireless device since a previous individual ACK, where the individual ACK was transmitted after the previous group ACK. The time period covered by the second indicator 404 would therefore be shorter than the time period covered by the first indicator 402.

In some embodiments, each wireless device (e.g., STA or access terminal) in the plurality of wireless devices communicating with the wireless device (access point) that transmits the plurality of indicators 400 is assigned an association identifier (AID). For example, each of the STAs 106 communicating with the AP 104 may be assigned a unique AID. In these embodiments, a wireless device receiving the plurality of indicators 400 may determine which of the indicators 402-412 to analyze based on the its AID.

For example, the STAs 106 may each be assigned an AID that has a value ranging from 1 to N. One of the STAs 106 may determine whether the AP 104 properly received or decoded a communication from that STA by indexing into the plurality of indicators 400 with the its AID, and evaluating the indicator at that index. As an example, when a wireless device that as been assigned the AID 3 receives the plurality of indicators 400, the wireless device may evaluate the indicator 406 to determine if a communication previously transmitted by the wireless device was received or correctly decoded.

As another example, the STAs 106 may each be assigned an AID that has a value ranging from 1+X through N+X. To determine whether the AP 104 properly received or correctly decoded a communication from one of the STAs 106, the one STA may evaluate the indicator positioned at index AID-X.

In some embodiments, the AIDs of the wireless devices to which the plurality of indicators 400 is directed are not sequential. For such embodiments, the AID may not directly correspond to an indicator index, but an order of the indicators 402-412 may still be determined based on the relative values of the AIDs. Those having ordinary skill in the art will recognize other methods that may be used to sequence, position, or arrange the indicators 402-412 based on an AID of the corresponding wireless device to which the each of the indicators 402-412 pertains.

In some aspects, the plurality of indicators 400 is implemented using a bitmap. In these embodiments, each of the indicators 402-412 is represented by one bit. For example, a value of 0 in one of the indicators 402-412 may indicate that a communication has not been received or correctly decoded, while a value of 1 in the indicator may signify that a communication has been received or correctly decoded. In some embodiments, these cases are switched.

When the plurality of indicators 400 is implemented using a bitmap and the indicators 402-412 are arranged according to the AIDs of the wireless devices associated with the access point transmitting the plurality of indicators 400, the plurality of indicators 400 may resemble a traffic indication map (TIM). Instead of each bit in the bitmap indicating whether a frame is buffered for a respective wireless device as in a TIM, each bit of the bitmap implementing the plurality of indicators 400 indicates whether a frame or packet has been received or correctly decoded from a corresponding wireless device since a previous ACK was transmitted to the corresponding wireless device. In such an embodiment, the array of indicators 402-412 may be referred to as an ACK TIM due to the similarity with the TIM. In some embodiments, a subset of the indicators 402-412 may be included in the plurality of 400, similar to the way in which a partial virtual bitmap may be included in a TIM.

In the embodiment illustrated in FIG. 4, five indicators 402-412 are shown. The plurality of indicators 400 may, however, include a greater or lesser number of indicators. For example, the plurality of indicators 400 may include two indicators in some embodiments. In other embodiments, the plurality of indicators 400 includes three or four indicators. In some embodiments, the plurality of indicators 400 includes greater than five indicators, for example 2008 indicators or more.

As discussed above, the plurality of indicators 400 may be transmitted in a group ACK by a wireless device 202r after that device receives an incoming data packet from one or more wireless devices 202t. Before sending the group ACK and after receiving the incoming data packet(s), the wireless device 202r may further decode the data packet(s) and check to see if a frame control sequence (for example a cyclic redundancy check) of the data packet(s) passes, thereby indicating that there are no errors in the reception of the data packet(s). In some aspects, an indicator signifying that the data packet(s) was correctly received is only set if the frame control sequence passes.

Figure 5A:
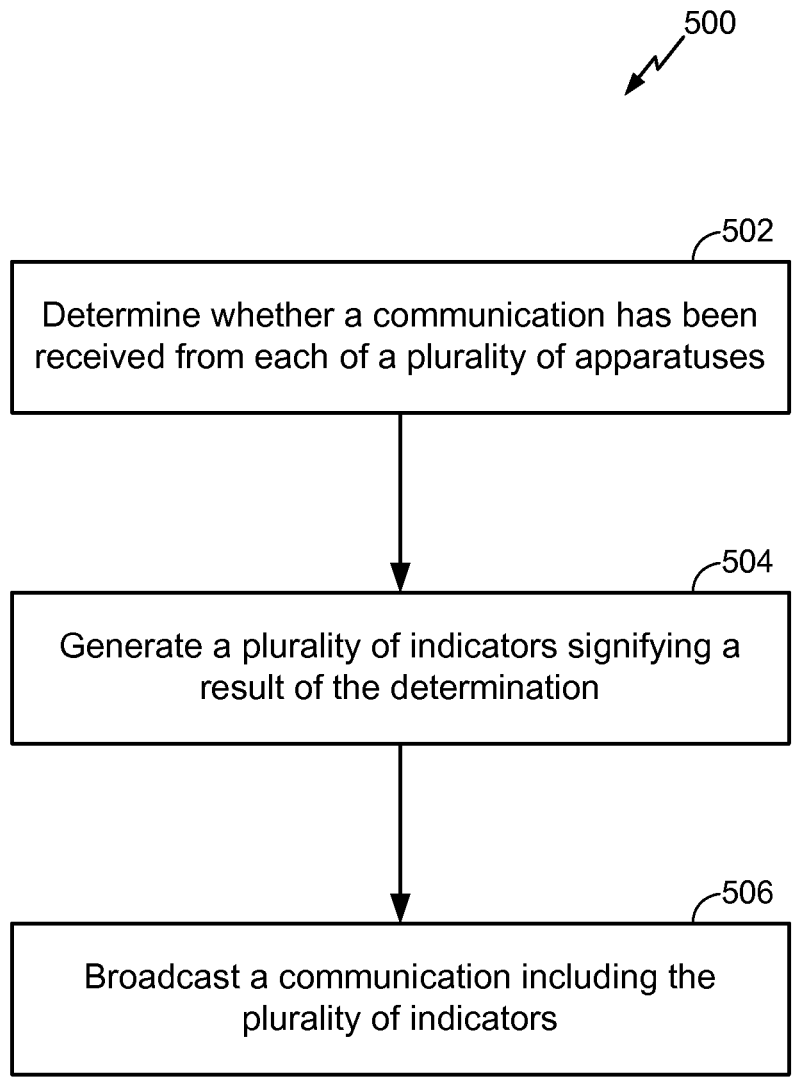
FIG. 5A illustrates an aspect of a method for transmitting a group ACK.

FIG. 5A illustrates an embodiment method 500 for transmitting a group ACK. The method 500 may be used to transmit the plurality of indicators 400 illustrated in FIG. 4, or another suitable plurality of indicators based on the teachings herein. The plurality of indicators 400 may be generated and transmitted at the AP 104, for example, and transmitted to a plurality of the STAs 106. Although the method 500 is described below with respect to elements of the wireless device 202, those having ordinary skill in the art will appreciate that other components may be used to implement one or more of the steps described herein.

At a block 502, it is determined whether a communication has been received (or correctly decoded) from each of a plurality of wireless devices. For example, the AP 104 may determine whether a packet was received or correctly decoded from each of the STAs 106 associated with the AP 104. Receiver 212 may perform the reception, for example. In some embodiments, it may be determined whether a communication has been received or correctly decoded within a previous period, for example a time period since a previous ACK was transmitted. This determination may be performed by the processor 204, the signal detector 218, and/or the DSP 220, for example.

At a block 504, a plurality of indicators signifying a result of the determination (as to whether a packet is received or correctly decoded) is generated. In some embodiments, each indicator signifies a result of this determination for a corresponding wireless device. In some embodiments, the plurality of indicators is represented by a bitmap, whereby each indicator is implemented with one bit. For such an embodiment, an order of the bits in the bitmap may be determined based on the AIDs of the plurality of wireless devices. This generation may be performed by the processor 204 and/or the DSP 220, for example.

At a block 506, a communication including the plurality of indicators is broadcast. The indicators may be broadcast within an information element in a beacon, for example, or as a separate group ACK including the bitmap. Transmitter 210 may perform this transmission, for example.

Figure 5B:
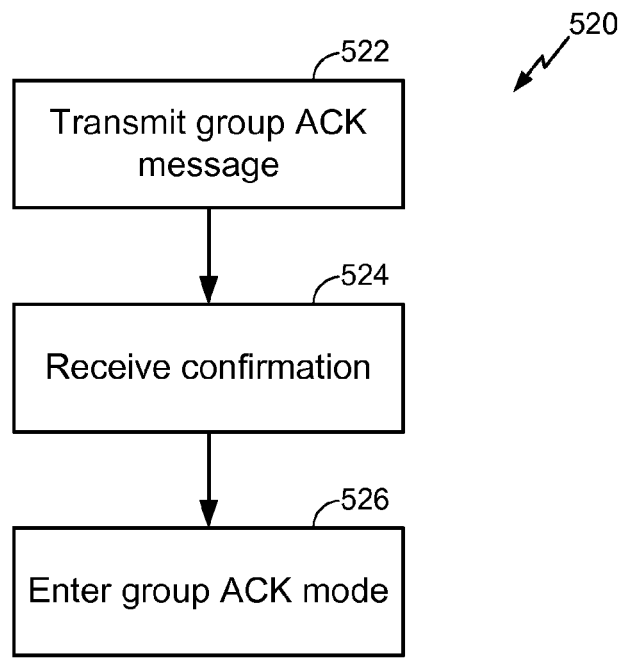
FIGS. 5B, 5C, 5D and 5E illustrate respective aspects of exemplary methods for establishing group ACK communication to coordinate operating modes.

In practice, the communication devices performing the methods may be coordinated so that the communication devices are each operating in a mode compatible with the operations of the other communication devices. FIG. 5B illustrates an aspect of a method 520 for establishing group ACK communication to coordinate the operating modes of, for example, the AP 104 and the STAs 106. The method 520 may be used, for example, by the AP 104 to transmit a notification of group ACK communication and enter a mode compatible with the STAs 106 for the group ACK communication. Although the method 520 is described below with respect to elements of the wireless device 202, those having ordinary skill in the art will appreciate that other components may be used to implement one or more of the steps described herein.

At a block 522, a group ACK begin message is transmitted, for example, by the AP 104 to one or more of the STAs 106. The message includes an indication or instruction that following the message, in response to communications to the AP 104, the AP 104 will acknowledge the receipt of the communications as part of a group ACK. In some implementations, the message may include an indication of a time after which the prospective communications will be acknowledged as part of a group ACK.

At a block 524, the STA 106 having received the group ACK begin message transmits a confirmation message to the AP 104. The confirmation message includes an indication or instruction that the STA 106 is in group ACK communications mode, and that in response to communications to the AP 104, the STA 106 is configured to receive and process communications from the AP 104 or other STA 106 which include group acknowledgements to determine whether communications from the STA 106 were successfully transmitted and received by the AP 104. In some implementations, the message may include an indication of a time after which the prospective communications will be acknowledged as part of a group ACK.

At a block 526, the AP 104 enters a group ACK communication mode according to the transmitted message. Once in the group ACK communication mode, the AP 104 is configured to generate communications that include group acknowledgements to acknowledge whether communications to the AP 104 were successfully received (and/or decoded) by the AP 104.

Figure 5C:
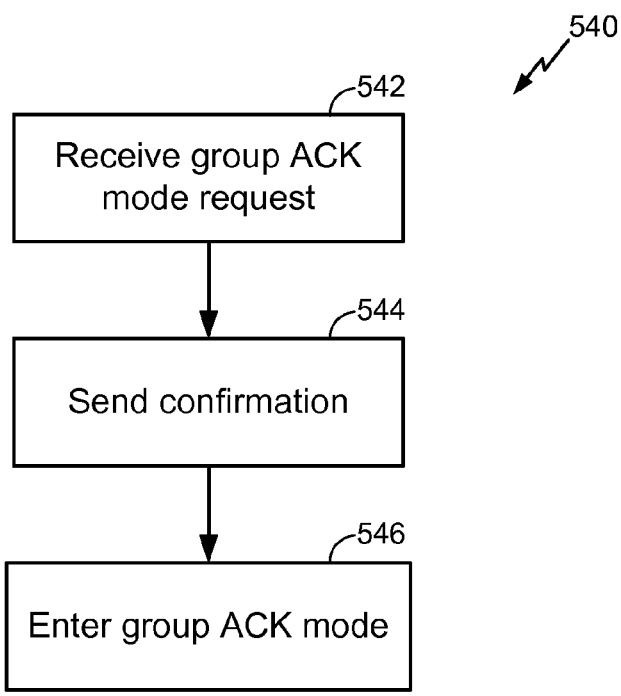

FIG. 5C illustrates an aspect of a method 540 for establishing group ACK communication to coordinate the operating modes of, for example, the AP 104 and the STAs 106. The method 540 may be used, for example, by the AP 104 to receive a request for group ACK communication and enter a mode compatible with the STAs 106 for the group ACK communication. Although the method 760 is described below with respect to elements of the wireless device 202, those having ordinary skill in the art will appreciate that other components may be used to implement one or more of the steps described herein.

At a block 542, a message is received, for example, by the AP 104 from one of the STAs 106. The message includes a request that, following the message, in response to communications from the STA 106 that transmitted the request, the AP 104 acknowledge the receipt of the communications as part of a group ACK. In some implementations, the message may include an indication of a time after which the prospective communications are to be acknowledged as part of a group ACK.

At a block 544, the AP 104 transmits a confirmation message to the STA 106 from which the message of block 542 was received. The confirmation message includes an indication or instruction that the AP 104 is in group ACK communications mode, and that in response to communications to the AP 104, the AP 104 will acknowledge the receipt of the communications as part of a group ACK. In some implementations, the message may include an indication of a time after which the prospective communications will be acknowledged as part of a group ACK.

At a block 546, the AP 104 enters a group ACK communication mode according to the received message. Once in the group ACK communication mode, the AP 104 is configured to transmit to the STA 106 that transmitted the request communications that include group acknowledgements to determine whether communications were successfully transmitted and received by the AP 104 or other STA 106.

Figure 5D:
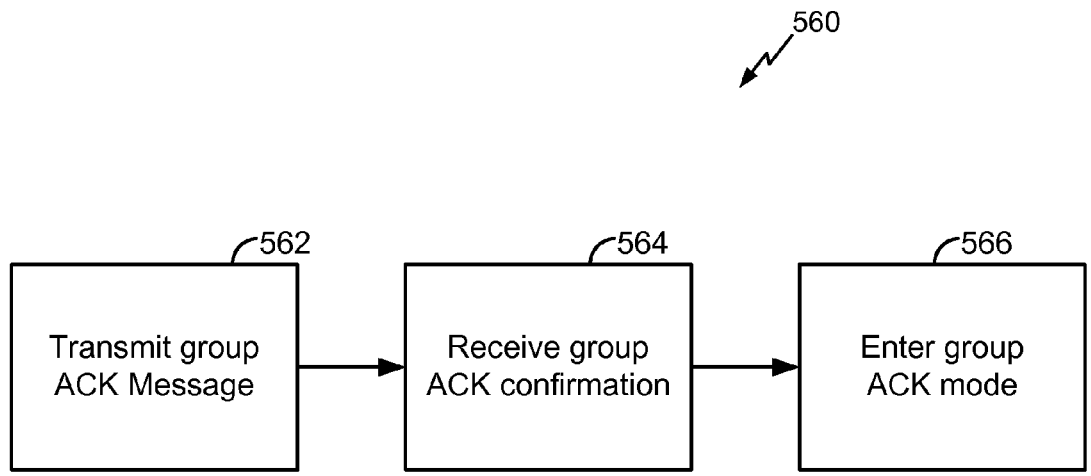

FIG. 5D illustrates an aspect of a method 560 for establishing group ACK communication to coordinate the operating modes of, for example, the AP 104 and the STAs 106. The method 560 may be used, for example, by the AP 104 to transmit a notification of group ACK communication and enter a mode compatible with the STAs 106 for the group ACK communication. Although the method 560 is described below with respect to elements of the wireless device 202, those having ordinary skill in the art will appreciate that other components may be used to implement one or more of the steps described herein.

At a block 562, a message is transmitted by the AP 104 to one or more of the STAs 106. The message includes a request that, following the message, in response to communications from the AP 104, the STA 106 receiving the message acknowledge the receipt of the communications as part of a group ACK. In some implementations, the message may include an indication of a time after which the prospective communications are to be acknowledged as part of a group ACK.

At a block 564, the AP 104 receives a confirmation message from the STA 106 to which the message of block 562 was transmitted. The confirmation message includes an indication or instruction that the STA 106 is in group ACK communications mode, and that in response to communications to the STA 106, the STA 106 will acknowledge the receipt of the communications as part of a group ACK. In some implementations, the message may include an indication of a time after which the prospective communications will be acknowledged as part of a group ACK.

At a block 566, the AP 104 enters a group ACK communication mode according to the transmitted message of block 562. Once in the group ACK communication mode, the AP 104 is configured to receive and process communications from the STA 106 which include group acknowledgements to determine whether communications from the STA 106 were successfully transmitted and received by the AP 104 or other STA 106.

Figure 5E:
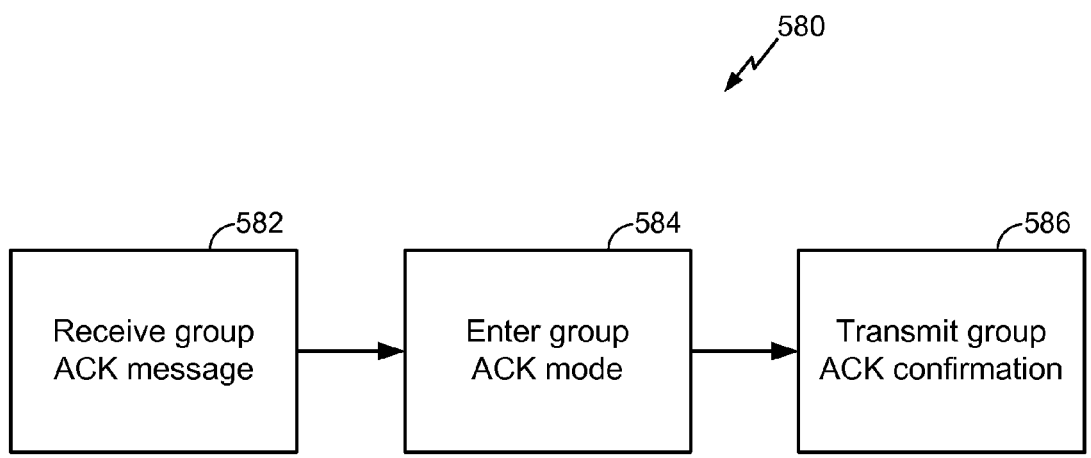

FIG. 5E illustrates an aspect of a method 580 for establishing group ACK communication to coordinate the operating modes of, for example, the AP 104 and the STAs 106. The method 580 may be used, for example, by the AP 104 to receive a request for group ACK communication and enter a mode compatible with the STAs 106 for the group ACK communication. Although the method 780 is described below with respect to elements of the wireless device 202, those having ordinary skill in the art will appreciate that other components may be used to implement one or more of the steps described herein.

At a block 582, a message is receive, by the AP 104 from one of the STAs 106. The message includes a request that, following the message, in response to communications from the AP 104, the STA 106 that transmitted the request acknowledge the receipt of the communications as part of a group ACK. In some implementations, the message may include an indication of a time after which the prospective communications are to be acknowledged as part of a group ACK.

At a block 584, the AP 104 enters a group ACK communication mode according to the transmitted message of block 582. Once in the group ACK communication mode, the AP 104 is configured to receive and process communications from the STA 106 which include group acknowledgements to determine whether communications from the STA 106 were successfully transmitted and received by the AP 104 or other STA 106.

At a block 586, the AP 104 transmits a confirmation message to the STA 106 from which the message of block 582 was received. The confirmation message includes an indication or instruction that the AP 104 is in group ACK communications mode, and is configured to receive and process communications from the STA 106 which include group acknowledgements to determine whether communications from the STA 106 were successfully transmitted and received by the AP 104 or other STA 106.

Figure 6:
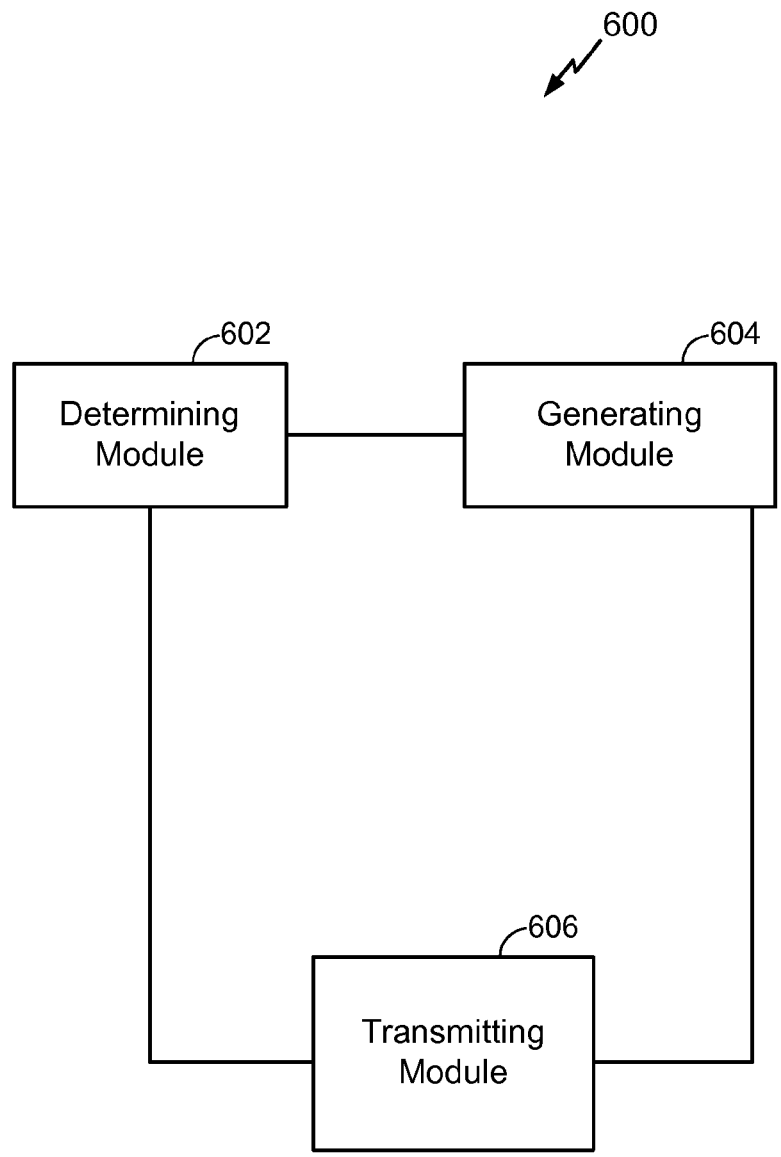
FIG. 6 is a functional block diagram of another exemplary wireless device that may be employed within the wireless communication system of FIG. 1.

FIG. 6 is a functional block diagram of another exemplary wireless device 600 that may be employed within the wireless communication system 100. The device 600 comprises a determining module 602 for determining whether a communication has been received from each of a plurality of wireless devices and correctly decoded, where the determination is made over some time interval or plurality of time intervals. That is, each wireless device may have an associated time interval. For some embodiments, the time intervals are relative to the time when a previous group ACK was sent. For some embodiments, the time interval associated with a wireless device may be relative to when a previous individual ACK was sent to that particular wireless device. The determining module 602 may be configured to perform one or more of the functions discussed above with respect to the block 502 illustrated in FIG. 5A.

The determining module 602 may correspond to one or more of the processor 204, the signal detector 218, and the DSP 220. The device 600 further comprises a generating module 604 for generating a plurality of indicators. In some aspects, each indicator signifies a result of the determination for a respective one of the plurality of wireless devices. In some aspects, the indicators are included in a bitmap in which each of the bits corresponds to a respective one of the plurality of wireless devices.

The generating module 604 may be configured to perform one or more of the functions discussed above with respect to the block 504 illustrated in FIG. 5. The generating module 604 may correspond to one or more of the processor 204 and the DSP 220. The device 600 further comprises a transmitting module 606 for broadcasting a communication including the plurality of indicators. The communication may comprise a group ACK, for example that is integrated into a beacon or that is transmitted separately from the beacon. The transmitting module 606 may be configured to perform one or more of the functions discussed above with respect to the block 506 illustrated in FIG. 5. The transmitting module 606 may correspond to the transmitter 210.

Figure 7A:
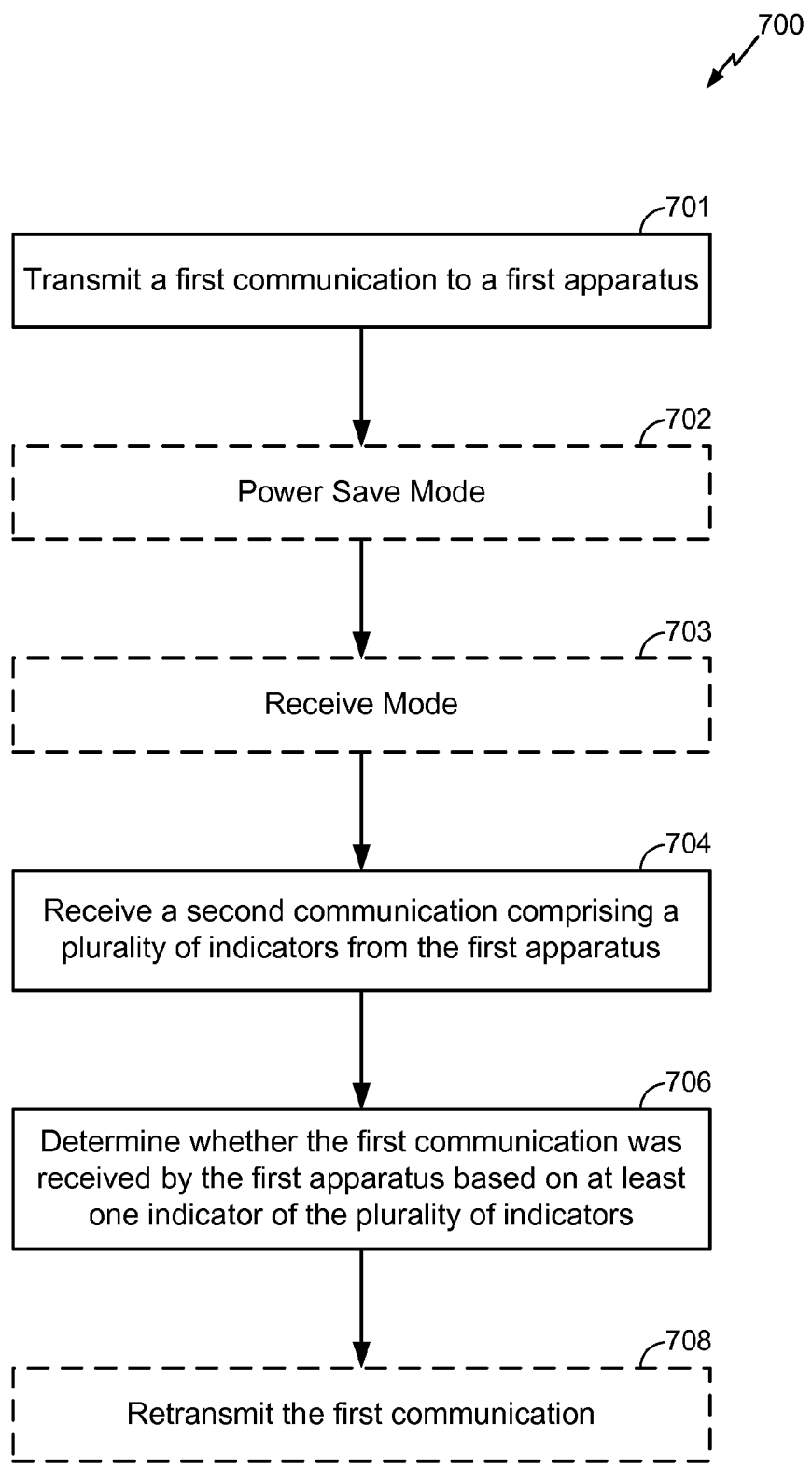
FIG. 7A illustrates an aspect of a method for receiving a group ACK.

FIG. 7A illustrates an aspect of a method 700 for receiving a group ACK. The method 700 may be used to receive the plurality 400 illustrated in FIG. 4, or another suitable plurality of indicators based on the teachings herein. The plurality of indicators 400 may be received and processed at one of the STAs 106, for example from the AP 104. Although the method 700 is described below with respect to elements of the wireless device 202, those having ordinary skill in the art will appreciate that other components may be used to implement one or more of the steps described herein.

At a block 701, a communication such as a data packet is transmitted to a wireless device, for example to the AP 104. The communication may comprise any one of a multitude of different types of frames or messages. Transmitter 210 may perform the transmission, for example.

At an optional block 702, after transmitting the communication at block 701, the STA 106 enters a power save mode, such as is discussed previously. Because the STA 106 does not need to be able to receive the ACK in response to the transmitted communication until a later scheduled time, the STA 106 can reduce system power consumption by entering a power save mode without causing system performance to suffer.

At an optional block 703, the STA 106 enters an awake mode so that it is able to receive communications. The time the STA 106 enters the awake mode may be determined based on the time scheduled for the group ACK communication. For example, while in the power save mode, the processor 204 of the STA 106 may be functional at least to the extent that it is able to cause the STA 106 to enter the awake mode once the scheduled time for the group ACK communication is near. For example, a certain amount of time may be used to transition from the power save mode to the awake mode. Once the time for the scheduled group ACK communication is the certain amount of time plus some optional margin away, the processor 204 may initiate the process by which the STA 106 transitions form the power save mode to the awake mode. Once in the awake mode, the STA 106 is prepared to receive the group ACK communication.

At a block 704, a group ACK communication comprising a plurality of indicators is received from the wireless device (e.g., access point). In some aspects, each indicator signifies whether the wireless device has received or correctly decoded a communication from a corresponding wireless device in a plurality of wireless devices. In some embodiments, the plurality of indicators is represented by a bitmap, whereby each indicator is implemented with one bit. In some embodiments, each of the indicators may signify whether a communication was received within a previous period, for example a time period since a previous ACK. There may be different time periods for different indicators. Receiver 212 may perform the reception, for example.

At a block 706, it is determined whether the communication transmitted at the block 702 was received by the wireless device (e.g., access point). The determination is based on at least one of the indicators received at the block 704. For example, an STA that transmitted the communication at the block 702 and received the plurality of indicators at the block 704 may determine if the communication was received or correctly decoded by the AP 104 by indexing into the plurality of indicators using the AID of the STA. A value of the indicator at that index may signify if the communication transmitted at the block 702 was properly received and decoded. The determination may be performed by the processor 204, the signal detector 218, and/or the DSP 220, for example.

If the communication transmitted at the block 702 was not properly received, as determined at the block 706, the communication may be retransmitted at an optional block 708. The transmitter 210 may perform the retransmission, for example.

Figure 7B:
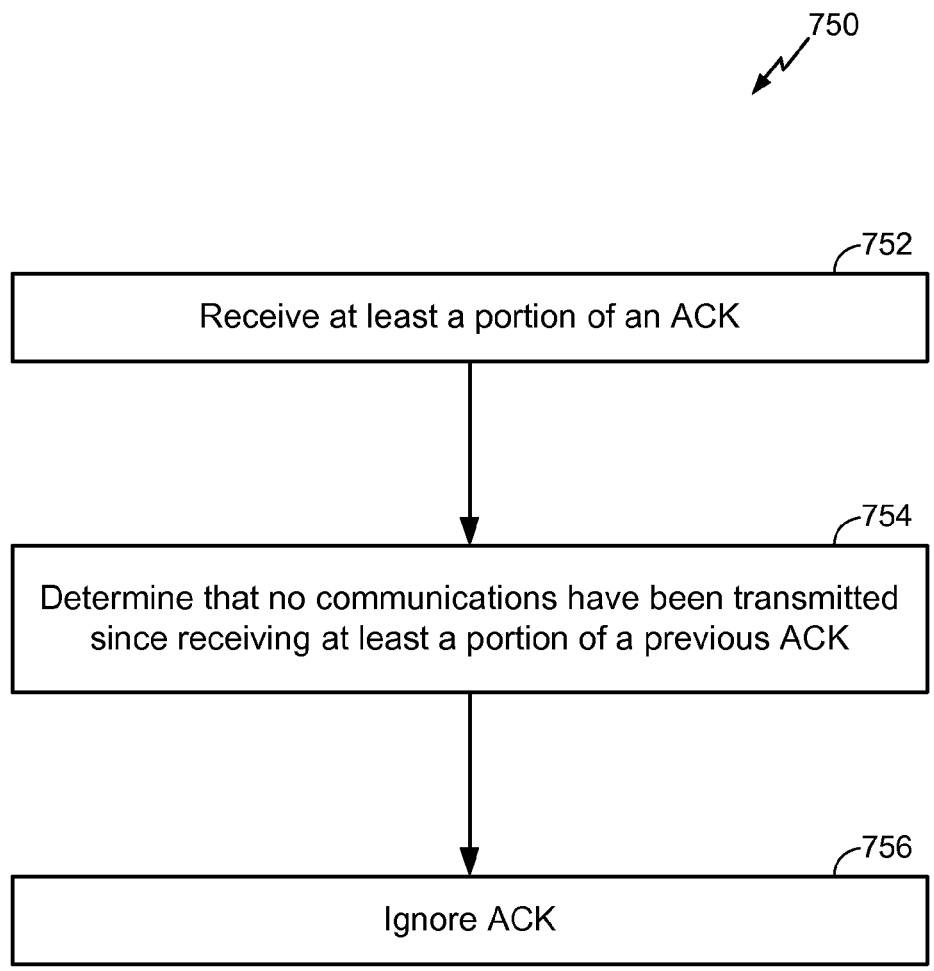
FIG. 7B illustrates another aspect of a method for receiving a group ACK.

FIG. 7B illustrates another aspect of a method 750 for receiving a group ACK. The method 750 may be used to receive at least a portion of the plurality of indicators 400 illustrated in FIG. 4, or another suitable plurality of indicators based on the teachings herein. The plurality of indicators 400 may be at least partially received and processed at one of the STAs 106, for example from the AP 104. Although the method 750 is described below with respect to elements of the wireless device 202, those having ordinary skill in the art will appreciate that other components may be used to implement one or more of the steps described herein.

At a block 752, at least a portion of a group ACK is received. For example, enough of the group ACK may be received for the wireless device 202 to determine that the information being received is a group ACK. In some aspects, the processor 204, the signal detector 218, and/or the DSP 220 may determine that the information corresponds to a group ACK based on header information, or based on contents of the plurality 400, for example. Receiver 212 may perform this reception, for example.

At a block 754, it is determined that no communications have been sent to the wireless device that transmitted the group ACK since a previous ACK was received at the wireless device 202. Processor 204 and/or the DSP 220 may perform this determination, for example.

At a block 756, reception of any remaining portion of the group ACK is interrupted and the group ACK is ignored. For example, the processor 204 may cease analyzing the group ACK or be precluded from evaluating the plurality of indicators 400. Similarly, reception of the remainder of the group ACK may be stopped at the receiver 212. In this way, when the wireless device 202 is not waiting for acknowledgment of any communications, the wireless device 202 may conserve power by reserving resources that would otherwise be allocated to receiving and/or processing the group ACK.

Figure 7C:
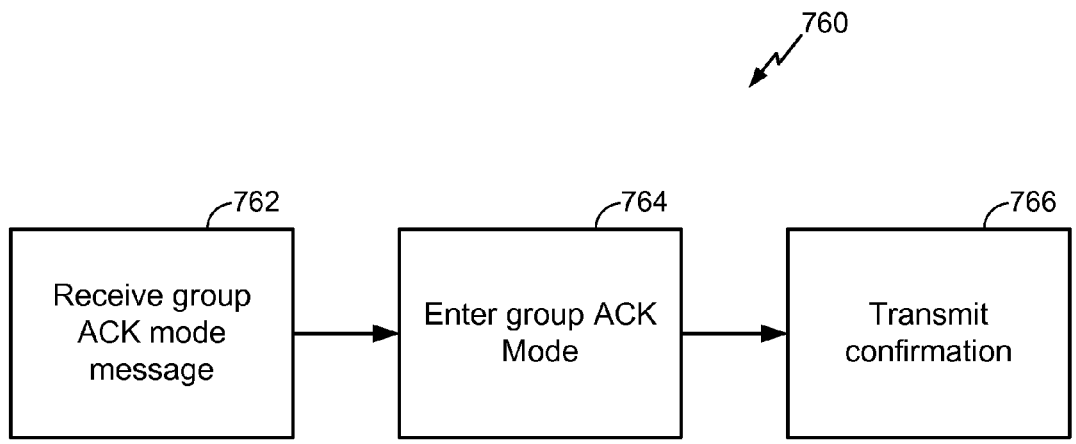
FIGS. 7C, 7D, 7E and 7F illustrate respective aspects of further exemplary methods for establishing group ACK communication to coordinate operating modes.

In practice, the communication devices performing the methods described may be coordinated so that the communication devices are each operating in a mode compatible with the operations of the other communication devices. FIG. 7C illustrates an embodiment of a method 760 for establishing group ACK communication to coordinate the operating modes of, for example, the AP 104 and the STAs 106. The method 760 may be used, for example, by a STA 106 to receive notification of group ACK communication and enter a mode compatible with the AP 104 and other STAs 106 for the group ACK communication. Although the method 760 is described below with respect to elements of the wireless device 202, those having ordinary skill in the art will appreciate that other components may be used to implement one or more of the steps described herein.

At a block 762, a message is received, for example, by one of the STAs 106 from the AP 104 or another STA 106. The message includes an indication or instruction that following the message, in response to communications from the STA 106 to the AP 104 or other STA 106, the AP 104 or other STA 106 will acknowledge the receipt of the communications as part of a group ACK. In some implementations, the message may include an indication of a time after which the prospective communications will be acknowledged as part of a group ACK.

At a block 764, the STA 106 enters a group ACK communication mode according to the received message. Once in the group ACK communication mode, the STA 106 is configured to receive and process communications from the AP 104 or other STA 106 that include group acknowledgements to determine whether communications from the STA 106 were successfully transmitted and received by the AP 104 or other STA 106.

At a block 766, the STA 106 transmits a confirmation message to the AP 104 or other STA 106 from which the message of block 762 was received. The confirmation message includes an indication or instruction that the STA 106 is in group ACK communications mode, and that in response to communications to the AP 104 or other STA 106, the AP 104 or other STA 106 will acknowledge the receipt of the communications as part of a group ACK. In some implementations, the message may include an indication of a time after which the prospective communications will be acknowledged as part of a group ACK.

Figure 7D:
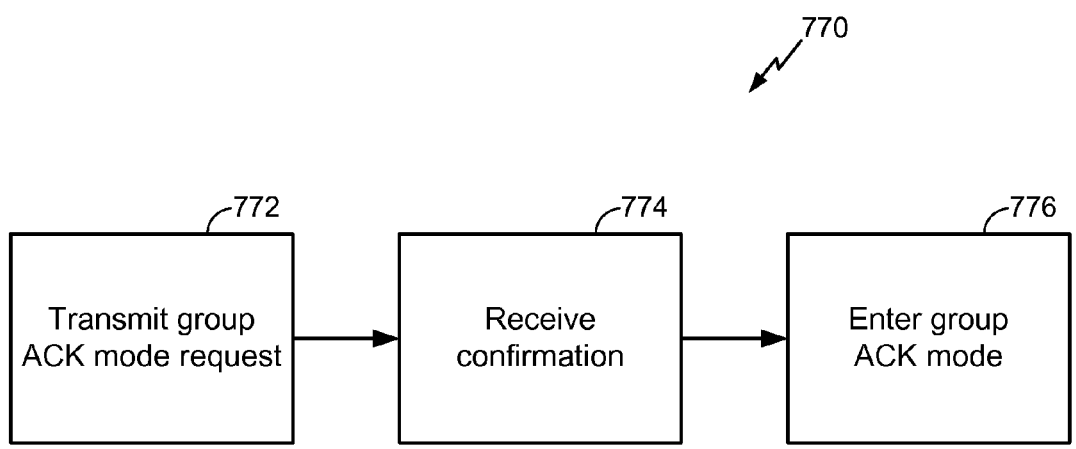

FIG. 7D illustrates an embodiment method 770 for establishing group ACK communication to coordinate the operating modes of, for example, the AP 104 and the STAs 106. The method 770 may be used, for example, by a STA 106 to request group ACK communication and enter a mode compatible with the AP 104 and the other STAs 106 for the group ACK communication. Although the method 770 is described below with respect to elements of the wireless device 202, those having ordinary skill in the art will appreciate that other components may be used to implement one or more of the steps described herein.

At a block 772, a message is sent, for example, by one of the STAs 106 to the AP 104 or another STA 106. The message includes a request that following the message, in response to communications from the STA 106 to the AP 104 or other STA 106, the AP 104 or other STA 106 acknowledge the receipt of the communications as part of a group ACK. In some implementations, the message may include an indication of a time after which the prospective communications are to be acknowledged as part of a group ACK.

At a block 774, a confirmation message is received by the STA 106 that sent the request at block 772 from the AP 104 or other STA 106 to which the request was sent. The confirmation message includes an indication or instruction that the request for group ACK communication is granted, and that following the message, in response to communications from the STA 106 to the AP 104 or other STA 106, the AP 104 or other STA 106 will acknowledge the receipt of the communications as part of a group ACK. In some implementations, the message may include an indication of a time after which the prospective communications will be acknowledged as part of a group ACK.

At a block 776, the STA 106 enters a group ACK communication mode according to the received message. Once in the group ACK communication mode, the STA 106 is configured to receive and process communications from the AP 104 or other STA 106 that include group acknowledgements to determine whether communications from the STA 106 were successfully transmitted and received by the AP 104 or other STA 106.

Figure 7E:
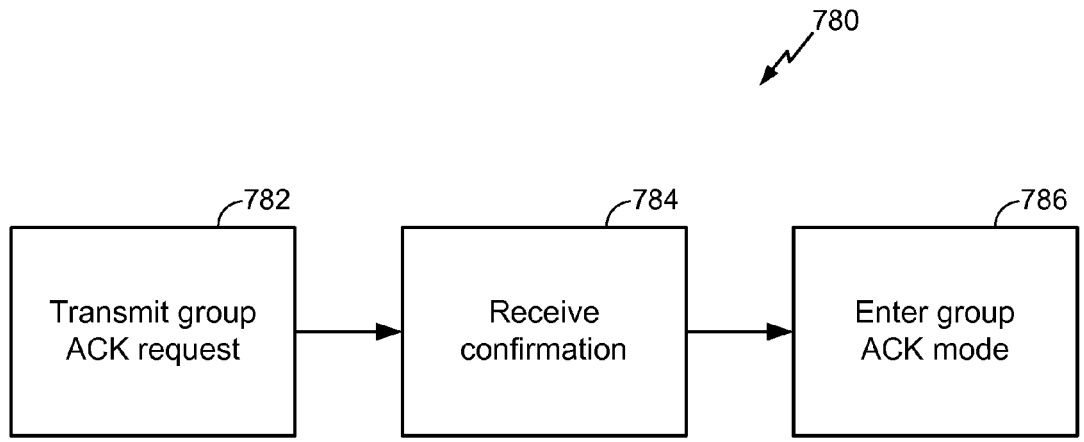

FIG. 7E illustrates an embodiment method 780 for establishing group ACK communication to coordinate the operating modes of, for example, the AP 104 and the STAs 106. The method 780 may be used, for example, by a STA 106 to request group ACK communication and enter a mode compatible with the AP 104 and other STAs 106 for the group ACK communication. Although the method 780 is described below with respect to elements of the wireless device 202, those having ordinary skill in the art will appreciate that other components may be used to implement one or more of the steps described herein.

At a block 782, a message is sent, for example, by one of the STAs 106 to the AP 104 or another STA 106. The message includes an indication or instruction that following the message, in response to communications to the STA 106 from the AP 104 or other STA 106, the STA 106 will acknowledge the receipt of the communications as part of a group ACK. In some implementations, the message may include an indication of a time after which the prospective communications will be acknowledged as part of a group ACK.

At a block 784, the STA 106 receives a confirmation message from the AP 104 or other STA 106 to which the message of block 782 was sent. The confirmation message includes an indication or instruction that the AP 104 or STA 106 is in group ACK communications mode, and is configured to receive and process communications from the STA 106 which include group acknowledgements to determine whether communications from the STA 106 were successfully transmitted and received by the AP 104 or other STA 106.

At a block 786, the STA 106 enters a group ACK communication mode according to the received message. Once in the group ACK communication mode, the STA 106 is configured to transmit to the AP 104 or other STA 106 that transmitted the message of block 782 communications that include group acknowledgements to determine whether communications were successfully transmitted and received by the STA 106.

Figure 7F:
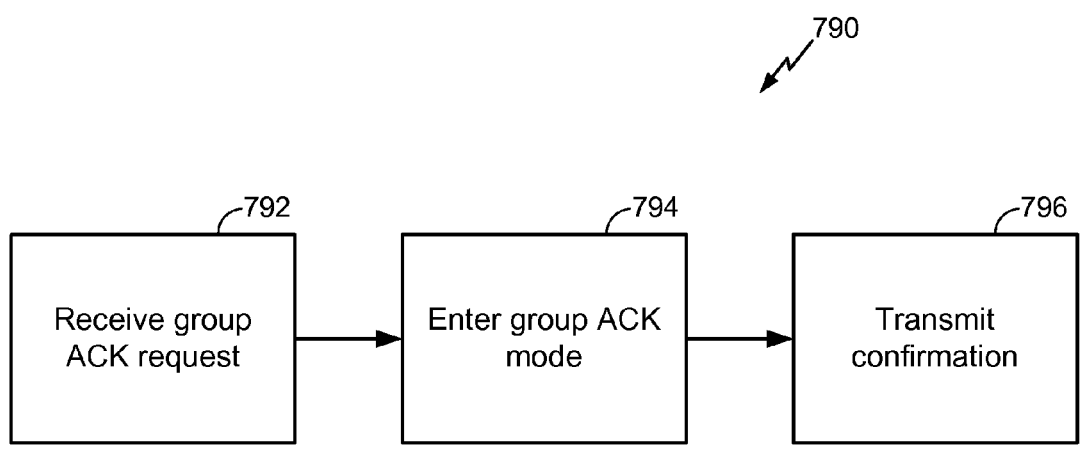

FIG. 7F illustrates an embodiment method 790 for establishing group ACK communication to coordinate the operating modes of, for example, the AP 104 and the STAs 106. The method 790 may be used, for example, by a STA 106 to receive notification of group ACK communication and enter a mode compatible with the AP 104 and other STAs 106 for the group ACK communication. Although the method 790 is described below with respect to elements of the wireless device 202, those having ordinary skill in the art will appreciate that other components may be used to implement one or more of the steps described herein.

At a block 792, a message is received, for example, by one of the STAs 106 from the AP 104 or one of the other STAs 106. The message includes a request that following the message, in response to communications from the STA 106 to the AP 104 or other STA 106, the STA 106 acknowledge the receipt of the communications as part of a group ACK. In some implementations, the message may include an indication of a time after which the prospective communications are to be acknowledged as part of a group ACK.

At a block 794, the STA 106 enters a group ACK communication mode according to the received message. Once in the group ACK communication mode, the STA 106 is configured to transmit to the AP 104 or other STA 106 that transmitted the message of block 792 communications that include group acknowledgements to determine whether communications were successfully transmitted and received by the STA 106.

At a block 796, the STA 106 transmits a confirmation message to the AP 104 or other STA 106 from which the message of block 792 was received. The confirmation message includes an indication or instruction that the STA 106 is in group ACK communications mode, and that in response to communications from the AP 104 or other STA 106, STA 106 will acknowledge the receipt of the communications as part of a group ACK. In some implementations, the message may include an indication of a time after which the prospective communications will be acknowledged as part of a group ACK.

Figure 8:
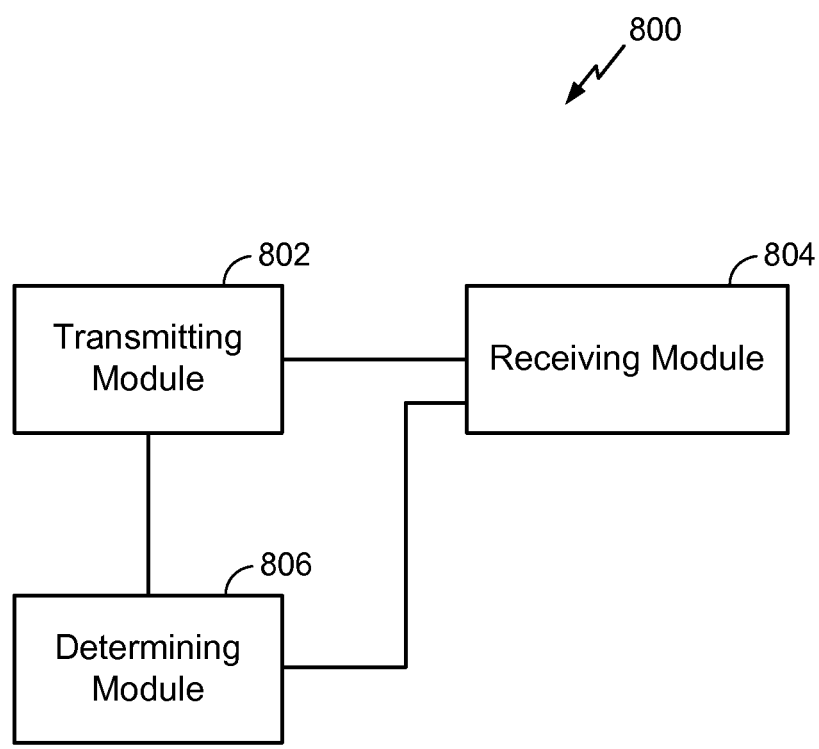
FIG. 8 is a functional block diagram of another exemplary wireless device that may be employed within the wireless communication system of FIG. 1.

FIG. 8 is a functional block diagram of another wireless device 800 that may be employed within the wireless communication system 100. The device 800 comprises a transmitting module 802 for transmitting a first communication to another wireless device, such as an AP, for example. The transmitting module 802 may be configured to perform one or more of the functions discussed above with respect to the block 702 illustrated in FIG. 7A and/or one or more of the functions discussed above with respect to the block 722 illustrated in FIG. 7D, and/or one or more of the functions discussed above with respect to the block 782 illustrated in FIG. 7E, and/or one or more of the functions discussed above with respect to the block 796 illustrated in FIG. 7F. The transmitting module 802 may correspond to the transmitter 210, for example.

The device 800 further comprises a receiving module 804 for receiving a second communication including a plurality of indicators from the AP. The receiving module 804 may be configured to perform one or more of the functions discussed above with respect to the block 704 illustrated in FIG. 7A, and/or one or more of the functions discussed above with respect to the block 752 illustrated in FIG. 7B, and/or one or more of the functions discussed above with respect to the block 762 illustrated in FIG. 7C, and/or one or more of the functions discussed above with respect to the block 774 illustrated in FIG. 7D, and/or one or more of the functions discussed above with respect to the block 784 illustrated in FIG. 7E, and/or one or more of the functions discussed above with respect to the block 792 illustrated in FIG. 7F. The receiving module 804 may correspond to the receiver 212, for example.

The device 800 further comprises a determining module 806 for determining whether the first communication was received or correctly decoded by the AP based on at least one indicator in the plurality of indicators. The determining module 806 may be configured to perform one or more of the functions discussed above with respect to the block 706 illustrated in FIG. 7A. In some embodiments, the determining module 806 is additionally or in the alternative configured to perform one or more of the functions discussed above with respect to the block 754 and/or the block 756 illustrated in FIG. 7B. The determining module 806 may correspond to the processor 204, the signal detector 218, and/or the DSP 220, for example.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for sending a group acknowledgment to reduce communication overhead. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of communicating in a wireless network having an access point and a plurality of wireless devices associated with the access point, the method comprising:
   for each wireless device in the plurality of wireless devices, determining at the access point whether one or more packets have been correctly decoded within a time interval associated with the each wireless device, the time interval being relative to when a previous group acknowledgement was transmitted to the each wireless device;
   generating at the access point a plurality of indicators in one to one correspondence with the plurality of wireless devices, each indicator signifying a result of the determining for a corresponding wireless device; and
   broadcasting, by the access point at a fixed period of time after a broadcast of the previous group acknowledgement, a group acknowledgment comprising the plurality of indicators,
   wherein the generating comprises generating an information element comprising the plurality of indicators, wherein the group acknowledgement includes the information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

2. The method of claim 1, wherein the time intervals associated with the plurality of wireless devices are all equal to each other.

3. The method of claim 1, wherein a first time interval associated with a first wireless device in the plurality of wireless devices is not equal to a second time interval associated with a second wireless device in the plurality of wireless devices.

4. The method of claim 1, wherein the generating comprises generating a bitmap to represent the plurality of indicators, each indicator in the plurality of indicators represented by one bit in the bitmap, and wherein the group acknowledgement includes the bitmap.

5. The method of claim 1, wherein a position of each indicator in the plurality of indicators indicates its corresponding wireless device.

6. The method of claim 1, wherein the broadcasting comprises broadcasting a beacon that includes the group acknowledgement.

7. The method of claim 1, wherein the group acknowledgement is broadcast at a scheduled time after broadcast of a beacon.

8. The method of claim 1, wherein for at least one wireless device, the time interval associated with the at least one wireless device is relative to when a previous acknowledgement was transmitted to the at least one wireless device.

9. The method of claim 1, further comprising:
   generating at the access point a message indicating that a prospective received communication will be acknowledged by broadcasting the group acknowledgement; and
   transmitting the message to the plurality of wireless devices.

10. The method of claim 1, further comprising:
    receiving messages from each of the plurality of wireless devices requesting that the access point generate the plurality of indicators and broadcast the group acknowledgment in response to a message received from at least one wireless device in the plurality of wireless devices.

11. An apparatus for communicating in a wireless network having a plurality of wireless devices, the apparatus comprising:
    a processor configured to determine for each wireless device whether at least one packet has been correctly decoded within a time interval associated with the each wireless device, the time interval being relative to when a previous group acknowledgement was transmitted to the each wireless device, configured to generate a plurality of indicators in one to one correspondence with the plurality of wireless devices, each indicator signifying whether the at least one packet from a corresponding wireless device is correctly decoded, and configured to generate the plurality of indicators by generating an information element comprising the plurality of indicators; and
    a transmitter coupled to the processor to broadcast, at a fixed period of time after a broadcast of the previous group acknowledgement, a group acknowledgment comprising the plurality of indicators, wherein the group acknowledgement includes the information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

12. The apparatus of claim 11, wherein the time intervals associated with the plurality of wireless devices are each equal to one another.

13. The apparatus of claim 11, wherein a first time interval associated with a first wireless device in the plurality of wireless devices is not equal to a second time interval associated with a second wireless device in the plurality of wireless devices.

14. The apparatus of claim 11, wherein the processor is configured to generate a bitmap to represent the plurality of indicators, each indicator in the plurality of indicators represented by one bit in the bitmap, and wherein the group acknowledgement includes the bitmap.

15. The apparatus of claim 14, wherein a position of each indicator in the plurality of indicators indicates a corresponding wireless device.

16. The apparatus of claim 11, wherein the group acknowledgment comprises a beacon.

17. The apparatus of claim 11, wherein the group acknowledgment is broadcast at a scheduled time after broadcast of a beacon.

18. The apparatus of claim 11, wherein the group acknowledgment is broadcast at a scheduled time as part of a beacon.

19. The apparatus of claim 11, wherein the processor is configured to generate a message indicating that a prospective received communication will be acknowledged by broadcasting the group acknowledgement; and the transmitter transmits the message to the plurality of wireless devices.

20. The apparatus of claim 11, wherein the processor is configured to generate the indicators and the transmitter is configured to broadcast the group acknowledgement in response to receiving a message from each of the plurality of wireless devices requesting that a prospective communication from the apparatus be acknowledged by broadcasting the group acknowledgment.

21. An apparatus for communicating in a wireless network having a plurality of wireless devices, the apparatus comprising:
  means for determining for each wireless device in the plurality of wireless devices whether at least one packet has been correctly decoded within a time interval associated with the each wireless device, the time interval being relative to when a previous group acknowledgement was transmitted to the each wireless device;
  means for generating a plurality of indicators in one to one correspondence with the plurality of wireless devices, each indicator signifying a result of the means for determining for a corresponding wireless device, wherein the means for generating comprises means for generating an information element comprising the plurality of indicators; and
  means for broadcasting, at a fixed period of time after a broadcast of the previous group acknowledgement, a group acknowledgment comprising the plurality of indicators, wherein the group acknowledgement includes the information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

22. A non-transitory computer readable storage medium having instructions stored thereon that when executed by an apparatus cause the apparatus to perform a method of communicating in a wireless network having an access point and a plurality of wireless devices associated with the access point, the method comprising:
  for each wireless device in the plurality of wireless devices, determining at the access point whether at least one packet has been correctly decoded within a time interval associated with the each wireless device, the time interval being relative to when a previous group acknowledgement was transmitted to the each wireless device;
  generating at the access point a plurality of indicators in one to one correspondence with the plurality of wireless devices, each indicator signifying a result of the determining for a corresponding wireless device, wherein the generating comprises generating an information element comprising the plurality of indicators; and
  broadcasting, by the access point at a fixed period of time after a broadcast of the previous group acknowledgement, a group acknowledgment comprising the plurality of indicators, wherein the group acknowledgement includes the information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

23. A method of communicating in a wireless network having an access point and a plurality of wireless devices, the method comprising:
  transmitting at a first wireless device in the plurality of wireless devices a first communication to the access point;
  receiving at the first wireless device a group acknowledgement from the access point broadcast at a fixed period of time after a broadcast of a previous group acknowledgement, the group acknowledgment comprising a plurality of indicators in one to one correspondence with the plurality of wireless devices, each indicator in the plurality of indicators signifying whether the access point correctly decoded communications from a corresponding wireless device within a time interval associated with the corresponding wireless device; and
  determining at the first wireless device whether the first communication was correctly decoded by the access point based on the indicator corresponding to the first wireless device,
  wherein the plurality of indicators are included in an information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

24. The method of claim 23, wherein the plurality of indicators are included in a bitmap.

25. The method of claim 24, wherein each indicator in the plurality of indicators consists of one bit in the bitmap.

26. The method of claim 23, wherein the group acknowledgment comprises a beacon.

27. The method of claim 23, further comprising receiving a beacon, and wherein the group acknowledgment is received at a scheduled time after receiving the beacon.

28. The method of claim 23, further comprising receiving a beacon, and wherein the group acknowledgment is received at a scheduled time as part of the beacon.

29. The method of claim 23, further comprising:
operating the first wireless device in a power save mode after transmitting the first communication;
subsequent to operating the first wireless device in the power save mode, at a time corresponding to a periodically scheduled time, operating the first wireless device in a mode to receive the group acknowledgment; and
receiving at the first wireless device the group acknowledgement at the periodically scheduled time.

30. The method of claim 23, further comprising receiving at the first wireless device a message from the access point, the message indicating that a prospective communication will be acknowledged by the access point by broadcasting the group acknowledgment.

31. The method of claim 23, further comprising transmitting by the first wireless device a message to the access point, the message requesting that a prospective communication to the access point be acknowledged by broadcasting the group acknowledgment.

32. A first wireless device for communicating in a wireless network having a plurality of wireless devices associated with an access point, the first wireless device belonging to the plurality of wireless devices, the first wireless device comprising:
a transmitter configured to transmit a first communication to the access point;
a receiver configured to receive a group acknowledgement from the access point broadcast at a fixed period of time after a broadcast of a previous group acknowledgement, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and
a processor configured to determine whether the first communication was correctly decoded by the access point based on the indicator corresponding to the first wireless device,
wherein the plurality of indicators are included in an information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

33. The first wireless device of claim 32, wherein the plurality of indicators are included in a bitmap.

34. The first wireless device of claim 33, wherein each indicator in the plurality of indicators consists of one bit in the bitmap.

35. The first wireless device of claim 32, wherein the group acknowledgment comprises a beacon.

36. The first wireless device of claim 32, wherein the receiver is further configured to receive a beacon, and wherein the group acknowledgment is received at a scheduled time after receiving the beacon.

37. The first wireless device of claim 32, wherein the receiver is further configured to receive a beacon, and wherein the group acknowledgment is received at a scheduled time as part of the beacon.

38. The first wireless device of claim 32, wherein the processor is further configured to cause the first wireless device to operate in a power save mode after transmitting the first communication, and at a time corresponding to a periodically scheduled time, to cause the receiver to operate in a mode to receive the group acknowledgment at the periodically scheduled time.

39. The first wireless device of claim 32, wherein the processor is configured to generate a message requesting that a prospective communication to the access point should be acknowledged by the access point broadcasting the group acknowledgment and to cause the transmitter to transmit the message to the access point.

40. The first wireless device of claim 32, wherein the receiver is configured to receive a message from the access point, the message indicating that a prospective communication from the transmitter will be acknowledged by the access point by transmitting the group acknowledgment comprising the plurality of indicators, and wherein the processor is configured to determine whether the first communication was received in response to the message.

41. A first wireless device for communicating in a wireless network having a plurality of wireless devices associated with an access point, the first wireless device belonging to the plurality of wireless devices, the first wireless device comprising:
means for transmitting a first communication to the access point;
means for receiving a group acknowledgement from the access point broadcast at a fixed period of time after a broadcast of a previous group acknowledgement, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and
means for determining whether the first communication was correctly decoded by the access point based on the indicator corresponding to the first wireless device,
wherein the plurality of indicators are included in an information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

42. A non-transitory computer readable storage medium having instructions stored thereon that when executed by a first wireless device cause the first wireless device to perform a method of communicating in a wireless network having an access point and a plurality of wireless devices associated with the access point, the first wireless device belonging to the plurality of wireless devices, the method comprising:

transmitting a first communication to the access point;

receiving a group acknowledgement from the access point broadcast at a fixed period of time after a broadcast of a previous group acknowledgement, the group acknowledgment comprising a plurality of indicators in one to one correspondence with the plurality of wireless devices, each indicator in the plurality of indicators signifying whether the access point correctly decoded communication from a corresponding wireless device within a time interval associated with the corresponding wireless device; and determining whether the first communication was correctly decoded by the access point based on the indicator corresponding to the first wireless device, wherein the plurality of indicators are included in an information element, wherein the information element comprises a length of the information element, a plurality of association identifications in one to one correspondence with the plurality of wireless devices, and a bitmap to represent the plurality of indicators, wherein each indicator in the plurality of indicators is represented by one bit in the bitmap, and wherein the plurality of association identifications identifies for which wireless device in the plurality of wireless devices each indicator has been generated.

* * * * *